July 23, 1935.    C. BERGSTROM    2,008,894
POWER OPERATED MANICURING APPARATUS
Filed July 10, 1933
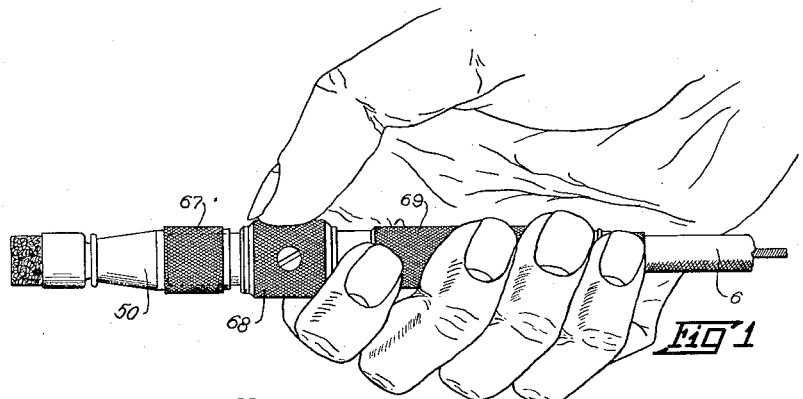
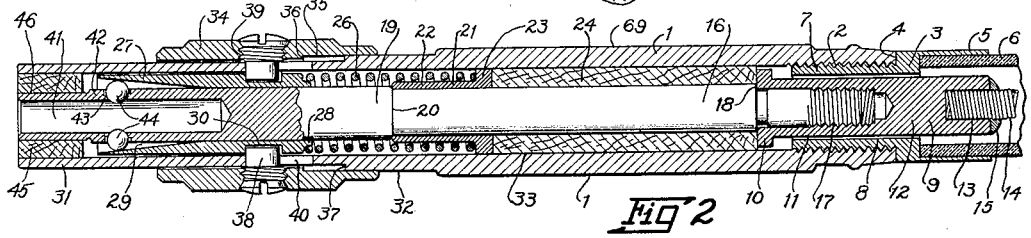
INVENTOR.
Carl Bergstrom
BY
Slough and Canfield
ATTORNEY.

Patented July 23, 1935

2,008,894

UNITED STATES PATENT OFFICE 2,008,894

POWER OPERATED MANICURING APPARATUS

Carl Bergstrom, East Cleveland, Ohio, assignor to The San Electro Company, Cleveland, Ohio, a corporation of Ohio Application July 10, 1933, Serial No. 679,743

24 Claims. (Cl. 132—74)

This invention relates to power operated manicuring apparatus and particularly to manicuring tool holders therefor.

In power operated manicuring apparatus of the type in which the manicuring tools are driven by a torque cable from an electric or like motor, a tool holder in the form of a handle is generally provided into which any one of a number of selected tools may be mounted to perform a selected manicuring operation. Such tool holder handles are provided with a handle portion proper and with a chuck portion operable by the hand of the operator to facilitate attachment of the tool to the handle and its removal therefrom.

It is an object of this invention to provide an improved tool handle for power operated manicuring apparatus.

Another object is to provide a handle of the class referred to having improved means for gripping a manicuring tool and for driving the tool.

Another object is to provide, in a tool supporting handle for power operated manicuring apparatus, improved means for operating the handle in the manner of a chuck to grip and release a manicuring tool.

Another object is to provide an improved chuck means adapted to be used in association with a handle to operatively grip and release manicuring tools.

Another object is to provide an improved tool or tools for performing various manicuring operations.

Another object is to provide an improved tool or tools for effecting manicuring operations and having improved means for renewing or replacing the operative portions of the tool.

Another object is to provide generally an improved means for supporting and driving any one of a plurality of manicuring tools for performing corresponding manicuring operations.

Another object is to provide, in a handle for supporting power driven manicuring tools, improved means whereby the tools may be selectively secured to the handle in driving relation or removed therefrom while tool driving power is being supplied to the handle.

Other objects will be apparent to those skilled in the art to which my invention appertains.

My invention is fully disclosed in the following description taken in connection with the accompanying drawing, in which:

Fig. 1 is an elevational view illustrating a tool handle embodying my invention and illustrating one mode of use thereof;

Fig. 2 is a longitudinal sectional view to an enlarged scale of the tool holder and handle of Fig. 1 with a manicuring tool shown in Fig. 1 omitted;

Fig. 3 is a fragmentary view to an enlarged scale of the tool holder of Fig. 1, illustrating one form of manicuring tool therewith;

Fig. 4 is a longitudinal sectional view illustrating another tool which may be employed with the handle of Figs. 1 and 2;

Fig. 5 is a view illustrating another tool;

Fig. 6 is a view taken from the plane 6—6 of Fig. 5;

Fig. 7 is a longitudinal sectional view illustrating still another tool;

Fig. 8 is a view taken from the plane 8—8 of Fig. 7;

Fig. 9 is a view showing separately a single element shown also in Figs. 7 and 8.

Referring to the drawing, I have shown at 1 an elongated generally tubular housing which may be referred to as the handle proper. At its rearward end it is internally threaded as at 2 and has screwed thereinto an externally threaded connecting element 3, generally tubular, and having a shoulder 4 which may be tightly drawn against the corresponding rearward end of the handle 1 to rigidly secure the element 3 to the handle and to seal the handle at its rearward end. The connecting element 3 has a rearwardly extending relatively thin skirt 5 within which is telescoped the end of cable sheath 6.

The sheath 6 may be secured to the inner wall of the skirt 5 in any suitable manner, and is made of flexible material such as rubber, and may be covered with a suitable fabric to render it pleasing in appearance; or the sheath 6 may be of the well known metal armored cable construction. The sheath is of considerable length and is adapted to extend to the housing of a power supplying motor, the sheath 6 itself being in the nature of a sealed enclosure, for a power cable therewithin seals the rearward end of the handle 2 in conjunction with the connecting element 3, to prevent the entrance to the interior of the handle of dust or other deleterious substances.

The threaded portion 7 of the connecting element which engages the thread 2 of the handle is internally bored in the axial direction as at 8 and a T-shaped head 12 of metal comprising a shank 9 and a flanged end or head 10 has the shank 9 telescoped into the bore 8 with considerable clearance as shown at 11 between the shank 9 and the bore 8 of the connecting element 3, whereby the head 12 may rotate in the bore by means to be described without frictional engagement with the wall of the bore.

The outer end of the shank 9 is axially bored as at 13 and the inner end of a cable 14 is inserted in the bore 13 and is rigidly secured and sealed thereto by solder or the like 15 joining the end of the shank and the outer wall of the cable. The cable 14 may be of any known or suitable construction and may comprise inner and outer close-wound helical springs extending from the shank 9 to the driving motor and connected to the motor to be rotated thereby to rotatably drive the head 12.

A stem 16, disposed axially in the handle 1, has its rearward end of reduced diameter and threaded as at 17, the reduction of diameter providing a transverse shoulder 18; and the threaded end 17 is screwed into a corresponding threaded bore of the head 12 with the shoulder 18 abutting the flange 10, whereby the head and stem may be rigidly connected together and the head may rotatably drive the stem 16 from power delivered by the cable 14.

The stem 16 has integral therewith at its forward end a chuck head 19, generally cylindrical and of slightly enlarged diameter, providing a transverse shoulder 20 longitudinally spaced from the shoulder 18.

A spring guide element 21 comprising a tubular shank 22 and a flange end 23 is telescoped over the stem 16 with one end engaging the shoulder 20 and the flange 23 spaced therefrom rearwardly.

A bearing bushing 24 of hollow cylindrical form is pressed into the handle 1 and the stem 16 in the portion between the shoulders 18 and 20 is rotatably fitted in the bore of the bushing. The bushing 24 is preferably constructed from oil impregnated wood and is secured to the handle by the press fit of its outer surface with the inner wall of the handle.

In assembling the parts thus far described, the stem 16 with the spring guide element thereon is telescoped through the bore of the bushing 24 before the head 12 is screwed onto the stem. The bushing is of such length that its axially opposite end will be engaged by the flanges 10 and 23 of the head 12 and spring guide element 21, respectively. The flanges and the ends of the bushing are finished in planes at right angles to the axis so that end thrust bearings are provided between the flanges and the bushing. Where oil impregnated wood is used for the bushing 24, both the said end thrust bearings and the rotary bearing of the stem are perpetually lubricated; and inasmuch as the bushing is secured to the inner wall of the handle, the end thrust bearings described prevent endwise movement of the spindle and the parts associated therewith.

A helical compression spring 26 is telescoped over the tubular spring guide element, abutting at one end upon the flange 23 thereof and at its forward end extending beyond the shoulder 20.

A chuck jaw element 27, generally of tubular form, is telescoped over the chuck head 19 and at its rearward end abuts upon the forward end of the spring 26, the rearward end of the chuck jaw element being formed with a neck portion 28 of reduced diameter which is telescoped into the forward end of the spring 26 to center the spring thereon. The forward end of the chuck jaw element 27 has the axial bore thereof forwardly flared providing a conical recess 29 in the end thereof. The intermediate portion of the chuck jaw element 27 has formed in the outer cylindrical surface thereof, an annular groove 30. The forward end portion 31 of the handle 1 is of relatively small outside diameter with respect to the handle portion proper 1 and has an intermediate portion 32 of intermediate diameter, whereas the axial bore 33 of the handle may be of uniform diameter throughout, except perhaps for the threaded portion 2 at the rearward end.

A tubular slide 34 is telescoped over the forward end portion 31 of the handle and on the rearward portion thereof has a bored out portion 35 of larger diameter providing an internal shoulder 36, the portion of larger diameter telescoping over the intermediate portion 32 of the handle. The slide 34 may be reciprocatively moved on the handle and its rearward movement may be stopped by the engagement of the internal shoulder 36 with a shoulder 37 on the handle at which the intermediate portion 32 joins the forward portion 31.

A plurality, such as two or three, screws 38 are threaded into radial threaded bores 39 through the wall of the tubular slide 34 and their inner ends are formed preferably cylindrical and project through corresponding axially extending slots 40 formed in the wall of the forward portion 31 of the handle. Inwardly beyond the slots 40 the cylindrical ends 38 of the screws project into the annular groove 30.

By the construction thus far described, the spring 26 normally holds the chuck jaw element 27 in a forward position and upon operatively moving the slide 34 rearwardly, the chuck jaw element will be retracted rearwardly compressing the spring 26; and in all positions of the chuck jaw element 27 it may rotate with the spindle in a manner to be described.

If desired, the forward and rearward movement of the slide 34 may be determined by the engagement of the cylindrical portions 38 of the screws with the forward and rearward ends of the slots 40—40.

The extreme forward end of the chuck head 19 of the spindle is axially bored out as at 41 forming a tube at the end of the head having a tube wall 42. The tube wall is radially bored at a plurality of points. Where two bores are employed, they are diametrically opposite. The bores are stepped, as shown at 43, being of larger diameter at the exterior of the wall 42 and of smaller diameter interiorly thereof. A pair of steel balls 44—44 are lodged in the stepped bores 43 and the bores and balls are of such size that a portion of the ball projects into the bore 41 and a portion projects outwardly through and beyond the wall 42.

The dimensions of the conical recess 29 relative to the outwardly projecting portions of the balls 44 are such that when the chuck jaw element 27 is projected forwardly by the spring 26, the outwardly projecting portions of the balls will be engaged by the conical surface and forced inwardly radially; and when the chuck jaw element is retracted as described, the balls will be loose in the stepped bores 43 and may move outwardly radially sufficiently so that they no longer project into the bore 41, but in such retracted position of the jaw element 27 and the balls are prevented from leaving the stepped bores by the forwardly projecting overhanging end of the conical bore.

A bearing bushing 45, preferably formed from oil impregnated wood is pressed into the bore of the handle at the extreme forward end thereof and is thereby secured to the handle. An inner bore 46 of the bushing provides a rotational bearing for the extreme forward end of the spindle.

The forward end of the tubular handle is thus sealed by the bushing and prevents the ingress of dust and other deleterious matter. The bushing 45 may be pressed into place after the other parts are assembled as above described.

Hereinafter are described a number of tools for performing various manicuring operations each of which is provided with a shank by which it is driven. Illustrative of the shanks is that shown in Fig. 4 at 47. The shank is cylindrical and of a size suitable to be telescoped into the bore 41 and is provided with a pair of diametrically opposite notches 48—48 at a point spaced from the rearward end of the shank. To secure the shank in the tool, the slide 34 is first retracted removing the conical surface 29 from the balls 44, and the shank is then inserted into the bore 41 until the notches 48—48 come opposite the balls. Stop means (to be described) is provided to determine this position for the shank. The slide 34 is then released and under the impulsion of the spring 26, the conical surface pushes the balls 44 inwardly and into the notches 48—48 thereby causing them to grip the shank 47 and transmit rotary movement of the spindle through the balls and notches to the shank 47 to rotate it.

In Fig. 3 is illustrated a manicuring buffing tool which may be used with the handle of Figs. 1 and 2, part of the handle being shown in Fig. 3. The tool comprises a tubular housing 50 having a relatively large bore 51 in the rearward end, a relatively small bore 52 in the forward end, and an intermediate dividing partition 53 having a co-axial bore 54 therein.

A tool shank 55 extends axially rearwardly in the housing 50 and is adapted to be inserted in the tool handle bore 41 and to be gripped therein by the balls 44 in notches 48 of the shank as above described. The bore 51 of the housing telescopes slidingly over the forward end portion 31 of the tool handle to support and center the housing on the handle independently of the shank 55. The shank is provided with an enlarged collar 56 disposed on the rearward side of the partition 53. The shank extends forwardly from the collar through the perforation 54 and on the forward end thereof has press-fitted the buffer support 58 comprising a bushing 60, a bore 57, and a tubular element 61. Said tubular element 61 is press-fitted over the forward end of the bushing 60, which at its forward end terminates in a cup portion 62, the cup skirt 63 of which telescopically fits the buffer 59, the buffer being generally cylindrical for this purpose and projecting outwardly beyond the forward edge of the cup skirt to provide working surfaces. The bushing 60 and element 61 are preferably press-fitted together and the element 61 rotates loosely within the bore 52 of the housing 50.

The bushing 60, press-fitted on the forward end of the shank, extends rearwardly approximately to the partition 53 and the bushing on one side and the collar 56 on the other side of the partition prevent axial movement of the shank in the housing 50.

An internal shoulder 64 on the housing may engage the forward end of the handle portion 31 so that when the shank is projected into the bore 41, the notches 48 will come into transverse alignment with the balls 44.

The buffer 59, besides being telescoped into the skirt 63, may be secured therein by screwing an internal bore 65 of the buffer upon a threaded point 66 secured in the forward end of the bore of the bushing 60 and projecting into the cup portion 62.

The rearward portion of the housing 50 has its external surface knurled as at 67 (see also Fig. 1) and the slide 34 has a knurled portion 68 and the handle proper a knurled portion 69. As illustrated in Fig. 1, the handle may be grasped by the knurled portion 69 between the palm of the hand and three of the fingers, the thumb and first finger being left free, and the knurled portion 68 may be grasped between the said thumb and first finger without moving the handle in the hand and the slide 34 may be moved backward and forwardly. The thumb and first finger may then be advanced to the knurled portion 67 again without moving the handle in the hand.

Thus by disposing these parts as described and illustrated, great facility in the use of the tool is attained. The operator can quickly and easily operate the slide and with his left hand remove the tool and replace another tool to be described and then move his thumb and finger over the knurled portion 67 to direct and control the operation of the tool. The housing 50 carrying the knurled portion 67 does not rotate with the spindle or the tool or its shank; thus the operator is enabled to accurately and carefully manipulate the tool. The changes from one tool to another can be made while the motor is running and the spindle is turning, if desired.

In Fig. 4 is illustrated a cleaning brush tool. The construction is generally similar to that of the buffer tool of Fig. 3 except that the forward end of the spindle is internally axially threaded as at 70 and a brush tool 71 has a threaded stem 72 adapted to be threaded into the threaded bore of the shank. A bushing 73 is pressed over the forward end of the shank, its inner end 74 being disposed adjacent the partition 53 to cooperate with the collar 56 to provide end thrust bearing for the spindle, and the bushing extending forwardly in telescoped relation to a shank portion 75 of the brush. In this form of tool also, the housing 50 may be held stationary to direct the movements of the tool.

In Fig. 5 is illustrated a cuticle compressing tool. It comprises a housing 77, generally tubular, having a rearward portion 78 and a forward portion 79, and a partition 80, generally similar to the housing 50 above described except that the forward portion is internally threaded as at 81. A nose piece 82 having a forwardly tapering end portion 83 is formed of reduced diameter as at 84 providing a shoulder 85 and the reduced diameter portion 84 is externally threaded upon the thread 81 whereby the nose piece may be screwed into the housing 79 with the shoulder 85 abutting the forward end of the housing portion 79 to seal the interior of the same.

The nose piece 82 is axially step bored with a bore of small diameter 86 extending inwardly from the forward end and a bore of larger diameter 87 providing an intermediate shoulder 88. The inner end of the reduced diameter portion is slotted with a plurality, such as two, axially extending slots 89—89.

The shank 90 extends rearwardly through a central perforation in the partition 80 and forwardly of the perforation is provided with an enlarged cam head 91, the underside of which abuts upon the partition and, the forward side of which is provided with a cam surface 92 generally in transverse planes.

A cam follower 93 is disposed in the bores 86 and 87 of the nose piece and has a forwardly extending cylindrical shank 94, and on its rearward end a cam face 95 cooperating as a cam follower with the cam face 92, and a pair of laterally extending lugs 96—96 extending into the slots 89—89. The shank 94 slidingly fits the bore 86, and, a compression spring 97, abutting upon the shoulder 88 and upon the lugs 96 or a shoulder adjacent thereto, holds the cam face 95 upon the cam face 92.

By this construction, as will now be clear, when the shank 90 is rotated, the cooperation of the cam faces will cause the cam follower 93 to be reciprocated, forwardly by the cams and rearwardly by the spring 97, the lugs 96 and slots 89 preventing rotation of the cam follower 93, and the spring 97 also holding the cam head 91 rearwardly against the partition 80. The forward end of the cam follower 93 is coaxially bored as at 99 and a removable renewable tip of wood 100, such as orange wood or the like, has a cylindrical shank 101 pressed into the bore 99 and a forwardly extending wedge shaped portion 102.

The tool as thus described may be mounted upon the handle by inserting the shank 90 in the bore 41 and engaging the notches 48 thereof with the balls as described. A reciprocatory hammer-like movement will be communicated to the tip 102 for compacting cuticle at the base of the finger nails.

The housing 78, telescoped over the handle as in the case of the housing 50 and the end 31 of the handle, may about upon the partition 80 to position the shank 90 in the handle. The housing 78 may be rotated between the thumb and finger engaging the knurled portion 67 thereof to position the wedge shaped tip 102 in relation to the finger nail as desired and to direct its movements upon the nail.

In Fig. 7 is illustrated a cutting or abrading tool. This tool comprises a housing 105 having a rearwardly tubular extending portion 106 adapted to be telescoped over the forward end 31 of the tool and a transverse wall 107 upon which the end of the tool may abut to position the shank. The forward end of the housing 105 has a forwardly projecting annular rim 108 providing a shallow circular pocket. An abrasive disc 109 lies in the pocket and has an oblong hole centrally thereof as at 110. A shank as illustrated separately in Fig. 9 comprising a small diameter stem 111, a head 112, flat on its under side as at 113, and an enlarged intermediate oblong neck 114, is projected through the perforation 110 in the disc and through an axial bore 115 in the housing 105, with the oblong neck 114 lodged in a circular recess 116 in the housing. The stem portion 111 has notches 48 above described.

To mount this tool upon the handle, the shank stem 111 is inserted into the bore 41 of the handle with the tubular portion 106 of the housing telescoped over the end 31 of the handle and abutting upon the transverse wall 107 to position the shank with the notches 48 at the balls 44. With the parts in this position, the disc will lie against the bottom of the shallow recess in the housing. Preferably, the disc has abrasive material only on the outer face thereof. The disc is rotated by the oblong neck 114 engaging the oblong perforation 110 and the housing 105 may be held stationary between the thumb and finger engaging the knurled portion 67 thereof to direct the disc as to position and direction upon the edges of the finger nails to trim them.

While I have shown what may be called the essential tools for performing the usual manicuring operations, it will be understood that other tools may be provided and it is believed that the foregoing description of tools embodying my invention will be sufficient for those skilled in the art to provide other tools without further description herein.

In the case of each of the tools above described, they may be centered and generally supported upon the end of the tool handle by the rearwardly extending tubular portion of the tool housing and thereby also positioned to dispose the shank of the tool for engagement with the chuck balls, and the housing may be conveniently grasped between the thumb and finger of the operator to position the tool and direct the operation accurately, safely and efficiently; and while supporting the tool handle proper in the palm of the hand with some of the fingers, the thumb and finger of the hand are left free to operate the tool as described when secured to the handle and to operate the slide for de-clutching one tool and removing it and replacing it with another and clutching it into the handle. The tools may thus be removed and replaced while the power is being continuously supplied to the handle.

My invention is not limited to the exact details of construction shown and described. Many changes and modifications may be made within the scope and spirit of my invention without sacrificing its advantages.

I claim:

1. In a manicuring tool holder, an elongated tubular handle, a bored bearing bushing formed from self-lubricating material press-fitted into the handle and having transverse opposite end bearing surfaces, a spindle rotatably mounted in the bore and means providing transverse bearing faces on the spindle engaging the opposite end surfaces of the bushing, and power means for rotating the spindle engaging one end portion thereof and tool chuck means associated with the other end.

2. In a manicuring tool holder, an elongated tubular handle, a spindle rotatably supported in the handle and having an axial bore in one end thereof providing a tubular wall, the wall being provided with a perforation, a ball in the perforation having portions projecting inwardly and outwardly from the perforation, and an axially movable element having an inclined surface for engaging the outwardly projecting portion of the ball and for forcing it inwardly, and manual means for axially moving the movable element.

3. A manicuring tool holder as described in claim 2 and in which the axially movable element is generally tubular and disposed in sliding telescopic relation with the spindle.

4. A manicuring tool holder as described in claim 2 and in which the axially movable element is generally tubular and disposed in sliding telescopic relation with the spindle and the inclined surface is the wall of a conical recess in the element coaxial of the spindle.

5. In a manicuring tool holder, a one piece handle having an axial bore therethrough, a bored bearing bushing pressed into the handle bore, a spindle rotatably mounted in the bushing bearing bore, the bushing having transverse bearing end faces, shoulders on the spindle engaging the end faces of the bushing to axially position the spindle in the handle, means sealing one end of the handle bore, a bored bearing bushing pressed into the other end of the handle bore, the spindle having an end portion rotatable therein.

6. In a manicuring tool holder, a one piece handle having an axial bore therethrough, a bored bearing bushing pressed into the handle bore, a spindle rotatably mounted in the bushing bearing bore, the bushing having transverse bearing end faces, shoulders on the spindle engaging the end faces of the bushing to axially position the spindle in the handle, means sealing one end of the handle bore, a bored bearing bushing pressed into the other end of the handle bore, the spindle having an end portion rotatable therein, a tool spindle recess in the said end of the spindle, providing a tubular wall, and operable means for gripping a tool spindle in the recess.

7. In a manicuring tool holder, a one piece handle having an axial bore therethrough, a bored bearing bushing pressed into the handle bore, a spindle rotatably mounted in the bushing bearing bore, the bushing having transverse bearing end faces, shoulders on the spindle engaging the end faces of the bushing to axially position the spindle in the handle, means sealing one end of the handle bore, a bored bearing bushing pressed into the other end of the handle bore, the spindle having an end portion rotatable therein, a tool spindle receiving recess in the end of the spindle, providing a tubular wall, and operable means acting through a perforation in the wall for gripping a tool spindle in the recess.

8. In a manicuring tool holder, a tubular handle, a spindle rotatably supported in the handle, the spindle having a recess in one end and provided with a perforation in the lateral wall of the recess, a ball in the perforation having portions projecting into the recess and laterally from the spindle, a sleeve on the spindle having a conical recess surrounding the spindle at its perforation and movable axially to force the ball inwardly in the recess.

9. In a manicuring tool, a generally tubular housing having a perforated transverse partition intermedite its ends, a tool operating shank rotatably mounted in the perforation, the housing having a tubular portion coaxial with the shank and radially spaced therefrom, and shoulder means on the shank on each side of the partition to axially position the shank in the housing.

10. In a manicuring tool, a generally tubular housing having a perforated transverse partition intermediate its ends, a tool operating shank rotatably mounted in the perforation and provided with a transverse notch in the side of the shank, the housing having a tubular portion coaxial with the shank and radially spaced therefrom, and shoulder means on the shank on each side of the partition to axially position the shank in the housing.

11. In a manicuring or like tool, a housing, a perforated transverse partition in the housing, a shank having an intermediate portion rotatable in the perforation and provided with a shoulder on each side of the partition to axially position the shank in the housing, the shank having a grip portion at one end adapted to be gripped by a chuck and a tool portion on the other end.

12. In a manicuring or like tool, a tool housing generally of tubular form having an intermediate transverse wall provided with a coaxial perforation therein, a shank having an intermediate portion rotatable in the perforation, a collar on the shank at one side of the transverse wall, a chuck grip portion of the shank smaller in diameter than the inner tubular wall extending coaxially of the tubular housing from one side of the transverse wall, the shank on the other side of the transverse wall having a portion of enlarged diameter substantially filling the tubular inner wall and a tool thereon extending outwardly from the tubular housing.

13. In a manicuring or like tool, a tool housing generally of tubular form having an intermediate transverse wall provided with a coaxial perforation, a shank having an intermediate portion rotatable in the perforation, means on the shank abutting the transverse wall to axially position the shank in the housing, a chuck grip portion of the shank of smaller diameter than the inner tubular wall extending rearwardly coaxially of a rearward portion of the tubular housing, the shank having a first cam face on the forward side of the wall, a reciprocable tool carrying element in the forward part of the housing having a second cam face engaging the first cam face, resilient means maintaining the cam faces in engagement, whereby upon rotation of the shank the tool may be reciprocated.

14. In a device of the class described, a tool holder comprising a tubular handle, a spindle rotatable in the handle, the spindle having a recess in one end provided with a perforation in the lateral wall of the recess, a ball in the perforation having a portion projecting into the recess laterally from the spindle, a sleeve on the spindle having a conical recess surrounding the spindle at the perforation, and movable axially to force the ball inwardly in the recess, and a tool support engaging the handle and having a shank projected into the recess, the shank provided with a laterally disposed notch engageable with the ball and disengageable therefrom upon alternate axial movement of the sleeve.

15. The device as described in claim 14, and in which means is provided externally of the handle for moving the sleeve in alternate axial directions.

16. In a device of the class described, a tubular handle, a spindle rotatable in the handle and having a recess in one end, a chuck element disposed in the handle, chuck means cooperating with the handle to direct the element radially inwardly into the recess, a tool support telescopically engaging the handle and having a shank projected into the recess, the shank being provided with a portion engageable with the said element whereby the spindle and shank may be rotated in unison.

17. In a device of the class described, a tool holder comprising a handle, the tool holder handle having a generally cylindrical portion adjacent one end, a spindle rotatable in the handle and having a recessed end portion, a chuck element movable radially inwardly in the recess and disposed in the recess wall, a tool housing telescopically engaging the cylindrical portion of the handle and having a shank rotatable in a transverse wall of the housing projected into the recess, and engageable by the chuck element whereby the shank may be driven by the spindle.

18. In a device of the class described, a tubular handle, a spindle rotatably supported on the handle, tool shank gripping means at one end portion of the spindle, a tool comprising a support, the handle and support having mutually telescopable portions whereby the support may be removably mounted on the handle, and the tool comprising a shank rotatably mounted on the support and the shank and support being provided with mutually engaged shoulder means for axially positioning the shank on the support, the shank being positionable for engagement by the gripping means by mutually telescoping the said portions of the support and handle, and a working tool portion rotatable by the shank extending axially outwardly of the support.

19. In a device of the class described, a tubular handle, a spindle rotatably supported on the handle, tool shank gripping means at one end portion of the spindle, a tool comprising a support, the handle and support having mutually telescopable portions whereby the support may be removably mounted on and rotatably movable on the handle, and the tool comprising a shank rotatably mounted on the support and the shank and support being provided with mutually engaged shoulder means for axially positioning the shank on the support, the shank being positionable for engagement by the gripping means by mutually teldescoping the said portions of the support and handle, and a working tool portion rotatable by the shank extending axially outwardly of the support.

20. In a device of the class described, a tubular handle, a spindle rotatably supported on the handle, tool shank gripping means at one end portion of the spindle, a tool comprising a support, the handle and support having mutually telescopable portions whereby the support may be removably mounted on the handle, and the tool comprising a shank rotatably mounted on the support and the shank and support being provided with mutually engaged shoulder means for axially positioning the shank on the support, the shank being positionable for engagement by the gripping means by mutually telescoping the said portions of the support and handle, the tool support being retained on the handle by engagement of the gripping means and the shank, a working tool portion rotatable by the shank extending axially outwardly of the support.

21. In a manicuring or like tool, a housing, a perforated transverse partition in the housing, a shank having an intermediate portion rotatable in the perforation and provided with shoulder means on each side of the partition to axially position the spindle in the housing, the shank having a grip portion at one end adapted to be gripped by a chuck and a tool portion on the other end, the housing having a portion generally coaxial of the grip portion adapted to be telescoped with a corresponding portion of a handle.

22. In a manicuring or like tool, a housing, a perforated transverse partition in the housing, a shank having an intermediate portion rotatable in the perforation and provided with shoulder means on each side of the partition to axially position the spindle in the housing, the shank having a grip portion at one end adapted to be gripped by a chuck and a tool portion on the other end, the housing having a generally cylindrical surfaced portion generally coaxial of the grip portion adapted to telescope with a corresponding cylindrical surface portion of a handle.

23. In a manicuring or like tool, a generally tubular housing having an intermediate transverse perforated partition therein, a spindle rotatable in the perforation, shoulder means on the spindle abutting one side of the perforation, the spindle extending in one axial direction from the partition substantially coaxial of and spaced from the tubular housing inner wall, the spindle on the other side of the partition having thereon a tool working portion and an enlarged diameter support substantially filling the tubular housing inner wall.

24. In a manicuring or like tool housing having a tubular partition and a shank of smaller diameter rotatably supported coaxially thereof, the housing and shank having shoulder means for axially positioning the shank in the housing, and the shank provided with a cam surface, a tool supporting element in the housing having splined engagement therewith to reciprocate therein and having a second cam surface, a spring for yieldingly maintaining the cam surfaces in engagement whereby upon rotation of the shank the tool may be reciprocated.

CARL BERGSTROM.